(12) United States Patent
Nahrwold et al.

(10) Patent No.: US 10,648,568 B2
(45) Date of Patent: May 12, 2020

(54) SEALING ARRANGEMENT AND SEALING RING

(71) Applicant: Carl Freudenberg KG, Weinheim (DE)

(72) Inventors: Olaf Nahrwold, Ludwigshafen (DE); Stefan Sindlinger, Weinheim (DE); Frank Lauer, Rauenberg (DE); Boris Traber, Hirschberg (DE); Jasmin Menzel, Weinheim (DE); Thomas Kramer, Rimbach (DE)

(73) Assignee: CARL FREUDENBERG KG, Weinheim (DE)

( * ) Notice: Subject to any disclaimer, the term of this patent is extended or adjusted under 35 U.S.C. 154(b) by 71 days.

(21) Appl. No.: 16/120,454

(22) Filed: Sep. 4, 2018

(65) Prior Publication Data

US 2019/0072183 A1    Mar. 7, 2019

(30) Foreign Application Priority Data

Sep. 4, 2017 (DE) .......................... 10 2017 008 314

(51) Int. Cl.
*F16J 15/3296* (2016.01)
*G01M 13/005* (2019.01)
*F16J 15/3284* (2016.01)

(52) U.S. Cl.
CPC ........ *F16J 15/3296* (2013.01); *F16J 15/3284* (2013.01); *G01M 13/005* (2013.01)

(58) Field of Classification Search
CPC ........ F16J 15/022; F16J 15/064; F16J 15/104; F16J 15/3284; F16J 15/3296; G01M 13/005

USPC .................................................. 277/321, 652
See application file for complete search history.

(56) References Cited

U.S. PATENT DOCUMENTS

| 2,249,141 A | * | 7/1941 | Johnson | ............... | F16J 15/3248 |
| | | | | | 277/575 |
| 5,246,235 A | * | 9/1993 | Heinzen | ................... | F16J 15/16 |
| | | | | | 116/208 |
| 5,540,448 A | * | 7/1996 | Heinzen | ............... | F16J 15/3296 |
| | | | | | 277/321 |

(Continued)

FOREIGN PATENT DOCUMENTS

| DE | 102006060382 A1 | 6/2008 |
| DE | 102016012552 A1 | 4/2018 |
| GB | 2533275 A | 6/2016 |

*Primary Examiner* — Nicholas L Foster
(74) *Attorney, Agent, or Firm* — Leydig, Voit & Mayer, Ltd.

(57) ABSTRACT

A sealing arrangement includes: a sealing ring having at least one dynamically loaded sealing lip, the sealing ring including a core comprised of an electrically conductive material and a casing comprised of an electrically insulating material, the casing having a material thickness, surrounding the core at least in part and including the sealing lip; a machine element to be sealed that has a surface to be sealed, which surface is electrically conductive and surrounded by the sealing lip in a radially prestressingly sealing manner; and a wear detector, which has an electric measurement device for detecting a state of wear of the sealing ring. When viewed in section, the material thickness of the sealing lip is smaller in a radial direction than the material thickness of a remainder of the casing.

12 Claims, 2 Drawing Sheets

(56) References Cited

U.S. PATENT DOCUMENTS

| | | | | |
|---|---|---|---|---|
| 5,785,323 A * | 7/1998 | Heinzen | ............... | F16J 15/3296 |
| | | | | 277/582 |
| 6,615,639 B1 * | 9/2003 | Heinzen | ................... | F16J 15/16 |
| | | | | 116/208 |
| 7,086,275 B2 * | 8/2006 | Bock | ................... | F16J 15/3296 |
| | | | | 277/317 |
| 7,405,818 B2 * | 7/2008 | Heinzen | ............... | F16J 15/3296 |
| | | | | 356/246 |
| 7,695,647 B2 * | 4/2010 | Smela | ...................... | H01B 1/22 |
| | | | | 252/512 |
| 8,448,949 B2 * | 5/2013 | Stewart | .................. | F16J 15/064 |
| | | | | 277/317 |
| 9,541,199 B2 * | 1/2017 | Rust | ....................... | F16J 15/064 |
| 2004/0232619 A1 * | 11/2004 | Bock | ................... | F16J 15/3296 |
| | | | | 277/317 |
| 2006/0220498 A1 * | 10/2006 | Kremer | ................... | G01L 1/142 |
| | | | | 310/338 |
| 2008/0042369 A1 * | 2/2008 | Krywitsky | ............. | F16J 15/186 |
| | | | | 277/522 |
| 2012/0119448 A1 * | 5/2012 | Stewart | .................. | F16J 15/064 |
| | | | | 277/650 |
| 2012/0267858 A1 * | 10/2012 | Rust | ....................... | F16J 15/064 |
| | | | | 277/321 |
| 2016/0186864 A1 * | 6/2016 | vom Stein | ........... | F16J 15/3248 |
| | | | | 277/500 |
| 2018/0112779 A1 | 4/2018 | Nahrwold et al. | | |
| 2019/0072183 A1 * | 3/2019 | Nahrwold | ............ | F16J 15/3296 |

* cited by examiner

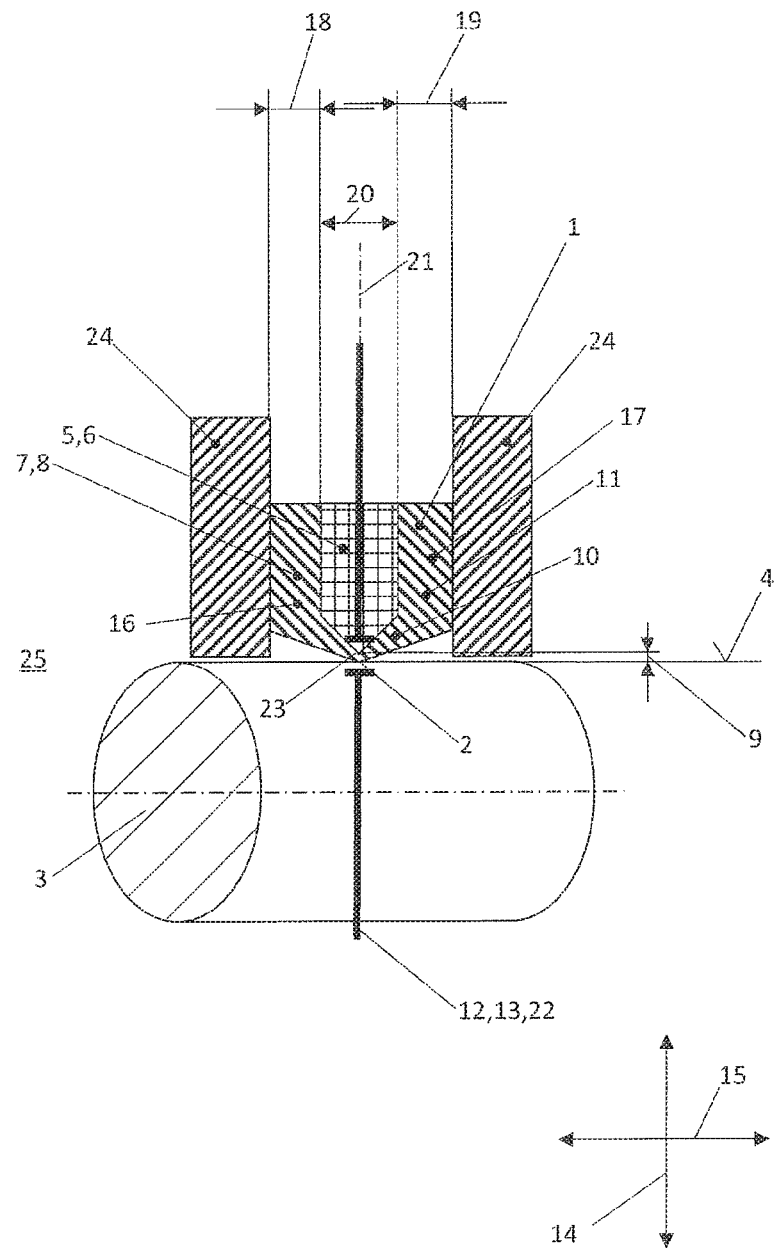

SEALING ARRANGEMENT AND SEALING RING

CROSS-REFERENCE TO PRIOR APPLICATION

Priority is claimed to German Patent Application No. DE 10 2017 008 314.2, filed on Sep. 4, 2017, the entire disclosure of which is hereby incorporated by reference herein.

FIELD

The invention relates to a sealing arrangement, comprising a sealing ring having at least one dynamically loaded sealing lip, and a machine element to be sealed that has a surface to be sealed, which surface is electrically conductive and surrounded by the sealing lip in a radially prestressingly sealing manner, the sealing ring comprising a core made of an electrically conductive material and a casing made of an electrically insulating material, the casing having a material thickness, surrounding the core at least in part and comprising the sealing lip, said sealing arrangement comprising a wear detector, which has an electric measurement device for detecting the state of wear of the sealing ring.

The invention also relates to a sealing ring consisting of the sealing arrangement, as described above.

BACKGROUND

A sealing arrangement of this kind and a sealing ring of this kind are disclosed in the earlier application DE 10 2016 012 552.7.

The electrically insulating casing has a material thickness that is constant in all peripheral regions around the electrically conductive core. The casing has a relatively low material thickness and rests flat on the core.

The wear detector comprises an electric measurement device that is designed as a capacitive measurement device. A measurement principle of this kind is based on an electric voltage being applied between the surface to be sealed of the machine element to be sealed and the core of the sealing ring, and the electrical capacitance between the surface to be sealed and the core being determined. Variables that influence the electrical capacitance are the dielectric constant of the casing and the radial distance between the surface to be sealed and the core.

Sealing rings having a sealing lip made of a sealing material, in particular dynamically loaded sealing lips, wear down when the sealing ring is used as intended. Wear of this kind may lead to there initially being a leak in the sealing arrangement and then to a breakdown of the entire sealing system.

When the material thickness of the sealing lip, which is part of the casing, changes as the wear becomes more severe, the electrical capacitance between the surface to be sealed and the core of sealing ring also changes, this change in the electrical capacitance being determined by suitable analysis electronics.

As is disclosed in the earlier application, gradual changes in the operating behavior of the sealing ring and gradual wear of the sealing lip can therefore also be detected. The state of the sealing ring is thus continuously monitored.

A further sealing arrangement is known from DE 10 2007 007 405 B4. The known sealing arrangement comprises a dynamically loaded sealing ring and an electric apparatus for detecting the state of wear of the sealing ring, the sealing ring consisting of an electrically conductive first sealing material, to which an electrically non-conductive second sealing material is attached, which is in sealing contact with the surface to be sealed of a machine element to be sealed. The surface to be sealed is electrically conductive, in the same way as the first sealing material.

When the second sealing material is completely worn, the electrically conductive surface to be sealed touches the also electrically conductive first sealing material, and a circuit for indicating complete wear, i.e. for indicating the destruction of the sealing ring, is closed.

In the case of such a configuration of the sealing arrangement, it should be noted that it is not possible to detect a gradual change in the state of the sealing ring. As a result of the closure of the circuit, it is merely indicated that the sealing ring is no longer in working order and must be immediately replaced.

SUMMARY

In an embodiment, the present invention provides a sealing arrangement, comprising: a sealing ring having at least one dynamically loaded sealing lip, the sealing ring comprising a core comprised of an electrically conductive material and a casing comprised of an electrically insulating material, the casing having a material thickness, surrounding the core at least in part and comprising the sealing lip; a machine element to be sealed that has a surface to be sealed, which surface is electrically conductive and surrounded by the sealing lip in a radially prestressingly sealing manner; and a wear detector, which has an electric measurement device configured to detect a state of wear of the sealing ring, wherein, when viewed in section, the material thickness of the sealing lip is smaller in a radial direction than the material thickness of a remainder of the casing.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 1 and 2 are schematic views of two embodiments of sealing arrangements.

FIG. 1 shows a sealing arrangement, as is disclosed in the earlier application mentioned at the outset, FIG. 2 shows an embodiment of a sealing arrangement according to the invention, in which a sealing ring according to the invention is used.

DETAILED DESCRIPTION

Figure 1:
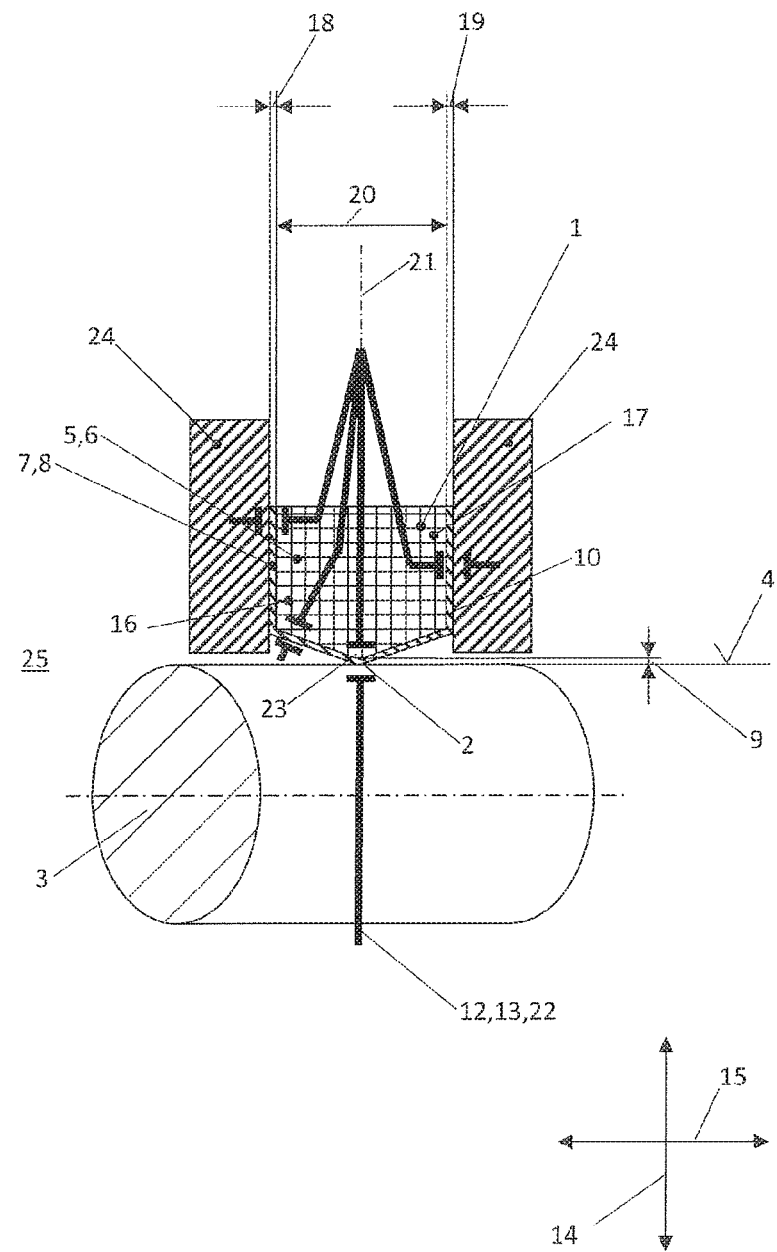

The object of the invention is to develop a sealing arrangement and a sealing ring of the type mentioned at the outset such that it is possible to continuously monitor the state of the sealing ring, such that the electric measurement device that is used to continuously monitor the state produces particularly accurate results, and such that in particular disruptive influences that may detrimentally influence the accuracy of the measurement results, such as parasitic capacitance, are minimized as far as possible.

In order for the object to be achieved, the material thickness of the sealing lip, when viewed in section, is smaller in the radial direction than the material thickness of the remainder of the casing.

The advantage here is that substantially only the material thickness of sealing lip, which decreases in the radial direction as a result of operation, influences the measurement result from the electric measurement device.

Based on the relatively smallest material thickness of the sealing lip, the relatively larger material thickness of the remainder of the casing ensures that disruptive influences that could detrimentally influence the measurement accuracy of the measurement result are practically eliminated. Without screening by means of the larger material thickness of the remainder of the casing, undesirable capacitive disruptive influences of this kind from regions adjacent to the sealing lip could be incorporated into the measurement for detecting the state of wear of the sealing ring and would detrimentally distort the measurement result. Disruptive influences could originate, for example, from the housing that surrounds the sealing ring or from the medium to be sealed. It would thus no longer be possible to reliably detect the current state of wear of the sealing ring and thus the entire sealing arrangement.

The material thickness of the casing is preferably adjusted to the application in question such that the material thickness of the casing is increased where disruptive levels of capacitance may arise. The material thickness of the sealing lip made of electrically insulating material is relatively the lowest only at the point at which the actual capacitance measurement takes place, specifically at a measurement point, which is delimited, on either side of the sealing lip in the radial direction, by the surface to be sealed on one radial side and by the core on the other radial side.

Since no undesirable capacitive disruptive influences are incorporated into the measurement by means of the electric measurement device, the measurement result is particularly accurate.

The core may consist of an elastomer material, in particular of common sealing materials.

The elastomer material may be made electrically conductive by means of electrically conductive particles, for example. Particles of this kind may be metal particles, for example.

The casing may also consist of an elastomer material or a PTFE material or another polymer material, such as PTFE, PEEK or PPS.

If both the core and the casing consist of an elastomer material, the core and the casing integrally adhere to one another particularly effectively on account of the similar material of which they are made.

If, by contrast, the casing consists of a PTFE material, the sealing lip has a particularly low coefficient of static friction and has high chemical resistance. A sealing lip made of a PTFE material is overall particularly wear-resistant.

According to one advantageous embodiment, the remainder of the casing may have the largest material thickness, the ratio of the largest material thickness to the material thickness of the sealing lip being at least 5, more preferably from 5 to 10. A ratio of this kind shows that the material thickness of the remainder of the casing is considerably greater than the material thickness of the sealing lip. On account of the relatively large material thickness and the resultant effective screening from external parasitic capacitance, it is possible to detect the operation-related change in the state of the sealing lip and thus the operation-related change in the sealing effect of the sealing ring and therefore the entire sealing arrangement in a particularly accurate manner.

Premature replacement of a still properly functioning sealing ring or damage to the sealing ring, or destruction thereof, that are to the surprise of the user are things of the past on account of the high measurement accuracy.

Starting from the sealing lip, the material thickness of the casing may continuously increase, at least to begin with, in the radial and/or axial direction. Sudden changes in direction, which could lead to notch stress in the material of the sealing ring and thus to premature breakdown of the sealing arrangement, are thus prevented.

When viewed in section, the casing may be substantially U-shaped and comprise two side faces, which extend substantially in the radial direction and between which the core is arranged, when viewed in the axial direction. The electrically conductive core is therefore practically enveloped in the electrically insulating casing. Only in the region of the sealing lip does the electrically insulating casing have the lowest material thickness. By contrast, in all other regions, specifically outside the measurement point, the insulating casing has a larger material thickness in order to keep external parasitic capacitance away from the measurement point and increase the measurement accuracy.

According to one advantageous embodiment, the side faces may each have an axial thickness that substantially corresponds to the axial thickness of the core. Both the measurement point and the core, which is located axially between the side faces, are well screened from parasitic capacitance originating, for example, from a housing in which the sealing ring is arranged, on account of the relatively thick side faces of the casing.

The core is annular and, on the side radially facing the sealing lip, preferably has a shape that is substantially congruent with the sealing lip, when viewed in section.

On the side radially facing the sealing lip, the core may be substantially cone-shaped, when viewed in section. The sealing ring has an overall simple structure as a result of a configuration of this kind. By adjusting the cone angle of the core and on account of the U-shaped design of the casing, the desired material thickness of the casing around the measurement point and the screening effect of the casing can be particularly simply adapted to the particular circumstances of the application.

If the cone angle of the core on the side radially facing the sealing lip is reduced, the material thickness of the casing increases relatively sharply outside the sealing lip/outside the measurement point, as does the effectiveness of the screening of undesirable parasitic capacitance.

If, by contrast, the cone angle is relatively large, the sealing lip and thus the measurement point may also be widened, when viewed in the axial direction.

The sealing ring may have an imaginary radial plane at the center in the axial direction and may be symmetrical in relation to the radial plane. The advantage here is that a sealing ring of this kind is particularly easy to produce and can be installed both ways round in the sealing arrangement. The risk of installation mistakes is minimized.

As is described above, the electric measurement device is preferably designed as a capacitive measurement device for continuously detecting the material thickness of the sealing lip in the radial direction. Since the material thickness of the sealing lip in the radial direction is continuously detected, the imminent breakdown of the sealing ring is signaled in sufficient time that the operator of the sealing arrangement can take timely, precautionary measures in advance, for example for a quick repair.

In comparison with an electric measurement device that only indicates the breakdown of a sealing ring/a sealing arrangement when said breakdown has actually occurred, this is highly advantageous.

The capacitive measurement device has a measurement point, which is delimited, on either side of the sealing lip in the radial direction, by the surface to be sealed on one radial side and by the core on the other radial side. In the region of the measurement point, the material thickness of the sealing lip made of electrically insulating material is the lowest.

The above-described sealing arrangement having the above-described sealing ring may be used in hydraulics or pneumatics, in the chemical industry, and in the food and drinks industry.

The sealing arrangement and the sealing ring consisting thereof may particularly preferably be used as a shaft seal for valves.

FIG. 1 shows an embodiment disclosed in the earlier application mentioned at the outset.

The sealing arrangement comprises a sealing ring 1 having a dynamically loaded sealing lip 2 which, in a radially prestressingly sealing manner, surrounds a surface 4 to be sealed of a machine element 3 to be sealed.

The surface 4 to be sealed is electrically conductive.

The sealing ring 1 comprises a core 5, which is enveloped in a casing 7 in the region of the side faces 16, 17 of said casing and on the side facing the surface 4 to be sealed.

The core 5 consists of an electrically conductive material 6, while the casing 7 consists of an electrically insulating material 8.

A wear detector 12, which comprises an electric measurement device 13 for detecting the state of wear of the sealing ring 1, is shown schematically.

When viewed in the section shown here, the casing 7 has a constant material thickness 9, 10, 11 overall. The material thickness 9 of the sealing lip 2 in the region of the measurement point 23 corresponds to the material thickness 10 outside the measurement point 23.

So that external parasitic capacitance, for example from the housing 24 or the medium 25 to be sealed, is kept away from the measurement point 23, the sealing arrangement according to the invention is provided with the sealing ring according to the invention.

FIG. 2 shows an embodiment of the sealing arrangement according to the invention having a sealing ring according to the invention.

In contrast with the sealing ring 1 from FIG. 1, the sealing ring 1 from FIG. 2 has a casing 7, in which, when viewed in the section shown here, the material thickness 9 of the sealing lip 2 is smaller in the radial direction 14 than the material thickness 10, 11 of the remainder of the casing 7. On account of the relatively larger material thickness 10, 11 outside the measurement point 23, the electric measurement device 13 is screened from disruptive electrical influences. The measurement result is therefore far more accurate and allows reliable conclusions to be drawn as to the current state of the sealing ring, in particular the state of the sealing lip 2.

In the embodiment shown here, the remainder of the casing 7 has the largest material thickness 11, the ratio of the largest material thickness 11 to the material thickness 9 of the sealing lip 2 being approximately from 7 to 8.

Starting from the sealing lip 2, the material thickness 10, 11 of the casing 7 increases continuously in the radial direction 14 and the axial direction 15 until the electrically insulating casing 7 transitions into the side faces 16, 17, which extend in the radial direction 14. On the side faces 16, 17, the material thickness 10, 11 of the casing 7 is constant and at its largest.

The side faces 16, 17 each approximately have an axial thickness 18, 19 that corresponds to the axial thickness 20 of the core 5. The core 5 is therefore particularly effectively screened from the influence of undesirable parasitic capacitance.

The sealing ring 1 is particularly simple and cheap to produce and can also be installed in a process-reliable manner, also for the reason that, at the center in the axial direction 15, said sealing ring has an imaginary radial plane 21, in relation to which said sealing ring is symmetrical.

By means of the wear detector 12 and its electric measurement device 13, which is designed as a capacitive measurement device 22, the material thickness 9 of the sealing lip 2 in the radial direction can be continuously detected. The measurement point 23 is delimited, on either side of the sealing lip 2 in the radial direction 14, by the surface 4 to be sealed on one radial side and by the core 5 on the other radial side, the surface 4 to be sealed and the core 5 each consisting of an electrically conductive material.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A sealing arrangement, comprising:
  a sealing ring having at least one dynamically loaded sealing lip, the sealing ring comprising a core comprised of an electrically conductive material and a casing comprised of an electrically insulating material, the casing having a material thickness, surrounding the core at least in part and comprising the sealing lip;
  a machine element to be sealed that has a surface to be sealed, which surface is electrically conductive and surrounded by the sealing lip in a radially prestressingly sealing manner; and
  a wear detector, which has an electric measurement device configured to detect a state of wear of the sealing ring,
  wherein, when viewed in section, the material thickness of the sealing lip is smaller in a radial direction than the material thickness of a remainder of the casing.

2. The sealing arrangement according to claim 1, wherein the remainder of the casing has a largest material thickness, and
wherein a ratio of the largest material thickness to the material thickness of the sealing lip is at least 5.

3. The sealing arrangement according to claim 2, wherein the ratio is from 5 to 10.

4. The sealing arrangement according to claim 1, wherein, starting from the sealing lip, the material thickness of the casing continuously increases, at least to begin, in the radial direction and/or in an axial direction.

5. The sealing arrangement according to claim 1, wherein, when viewed in section, the casing is substantially U-shaped and comprises two side faces, which extend substantially in the radial direction and between which the core is arranged, when viewed in an axial direction.

6. The sealing arrangement according to claim 5, wherein the side faces each have an axial thickness that corresponds substantially to an axial thickness of the core.

7. The sealing arrangement according to claim 1, wherein the core is annular and, on a side radially facing the sealing lip, has a shape that is substantially congruent with the sealing lip, when viewed in section.

8. The sealing arrangement according to claim 1, wherein, on a side radially facing the sealing lip, the core is substantially cone-shaped, when viewed in section.

9. The sealing arrangement according to claim 1, wherein the sealing ring has an imaginary radial plane at a center in an axial direction and is symmetrical in relation to the radial plane.

10. The sealing arrangement according to claim 1, wherein the electric measurement device comprises a capacitive measurement device configured to continuously detect the material thickness of the sealing lip in the radial direction.

11. The sealing arrangement according to claim 10, wherein the capacitive measurement device has a measurement point, which is delimited, on either side of the sealing lip in the radial direction, by the surface to be sealed on one radial side and by the core on an other radial side.

12. The sealing ring of the sealing arrangement according to claim 1, wherein, when viewed in section, the material thickness of the sealing lip is smaller in the radial direction than the material thickness of the remainder of the casing.

* * * * *